Aug. 16, 1955 K. CLARK 2,715,233
PUNCH PRESS OPERATED SCREW CUTTING TOOL
Filed April 12, 1950 3 Sheets-Sheet 1

INVENTOR.
KENDALL CLARK.
BY Dybvig & Dybvig
HIS ATTORNEYS

Aug. 16, 1955          K. CLARK          2,715,233
PUNCH PRESS OPERATED SCREW CUTTING TOOL
Filed April 12, 1950          3 Sheets-Sheet 2

INVENTOR.
KENDALL CLARK
BY Dybvig & Dybvig
HIS ATTORNEYS

Aug. 16, 1955 K. CLARK 2,715,233
PUNCH PRESS OPERATED SCREW CUTTING TOOL
Filed April 12, 1950 3 Sheets-Sheet 3

INVENTOR.
KENDALL CLARK,
BY Dybvig & Dybvig
HIS ATTORNEYS.

United States Patent Office 2,715,233
Patented Aug. 16, 1955

2,715,233

PUNCH PRESS OPERATED SCREW CUTTING TOOL

Kendall Clark, Glen Ellyn, Ill.

Application April 12, 1950, Serial No. 155,430

3 Claims. (Cl. 10—129)

This invention relates to a punch press operated screw cutting tool for use in manufacturing sheet metal stampings.

It is an object of this invention to provide a very simple, yet practical, apparatus which may be used on a punch press for forming threads on the pieces punched out by the press.

It is now standard practice in big factories to form threads on stampings after the stampings have been removed from the punch press. The reason for this is that punch presses have reciprocating parts only, whereas the formation of threads requires the use of a rotary tap or die. It is an object of this invention to provide a punch press with a fixture which makes it possible to utilize power derived from the reciprocating movement of the punch press ram for operating a rotary thread cutting tap or die.

Another object of this invention is to provide an improved arrangement for converting the reciprocatory movement of a punch press element to rotary movement of a driven element.

Still another object of this invention is to provide an improved arrangement for supplying lubrication to the screw cutting apparatus and for removing the chips formed thereby. More particularly, it is an object of this invention to provide means for simultaneously supplying a mixture of compressed air and lubricant to the screw cutting apparatus in such a manner as to lubricate the thread cutting die and remove the chips.

Other objects and advantages reside in the construction of parts, the combination thereof and the mode of operation, as will become more apparent from the following description.

Figure 1:
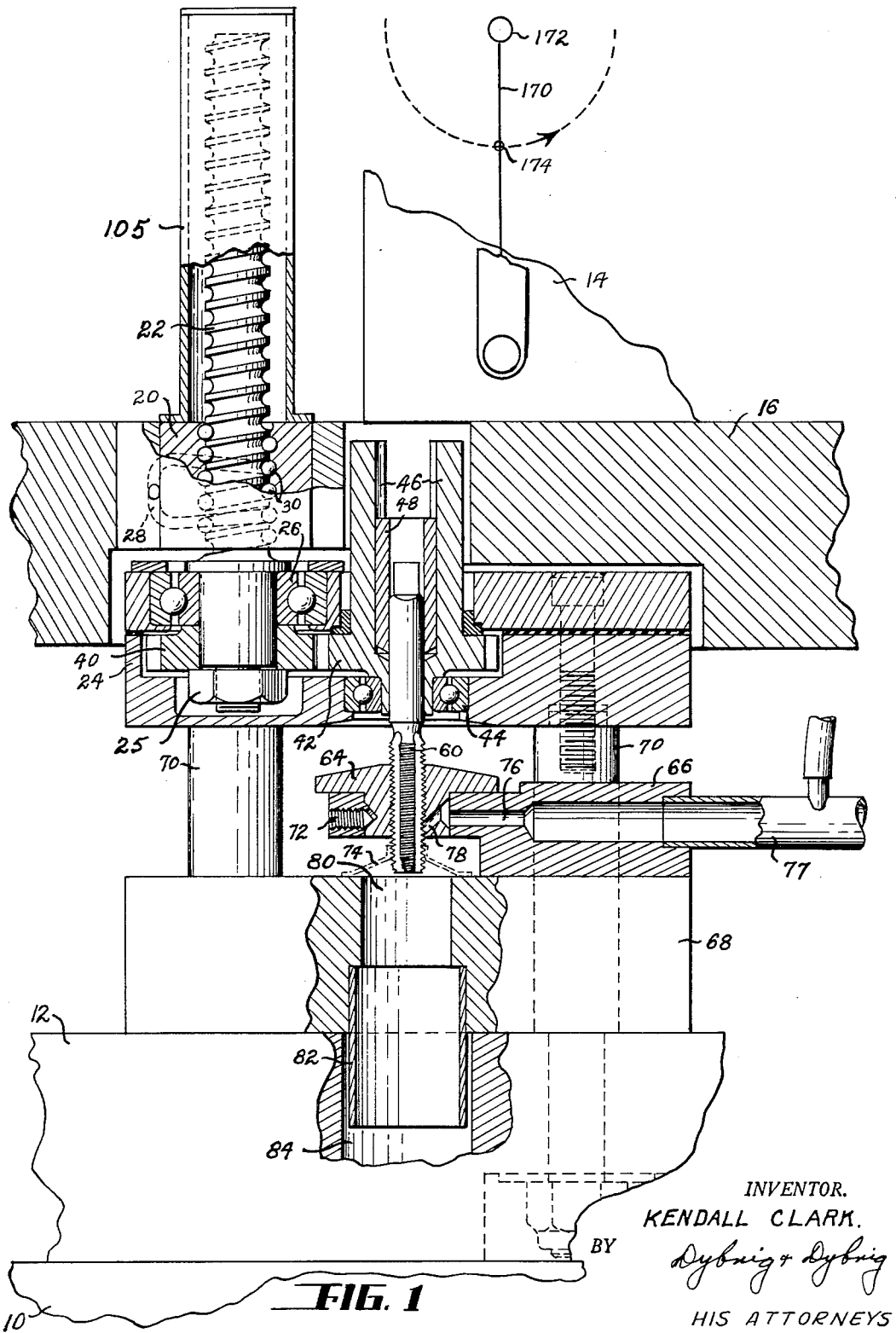
Figure 1 is an elevational view, partly in section, showing my invention applied to a punch press.

Referring now to the drawings wherein I have shown a preferred embodiment of my invention, reference numeral 10 designates the stationary frame portion or bed of a conventional punch press and reference numeral 12 designates the lower die shoe or the fixed portion of a progressive type of die. While the invention has been shown as applied to a progressive type of die in which a series of operations are performed in sequence on a given piece of material, it is to be understood that the invention is also applicable to use in a punch press, even though the only operation to be performed is that of cutting threads. The various types of operations performed upon the piece part being blanked out will, of course, depend upon the piece part being formed and consequently the various operations performed on the punch press will vary from one job to another.

Reference numeral 14 designates the ram which actuates the upper die shoe or movable punch element 16 of the punch press. In order to convert the reciprocatory movement of the element 16 into rotary movement, so as to cut threads in the stamping being formed by the punch press, a ball bearing nut 20 has been secured to the movable die shoe element 16. The nut 20 cooperates through a series of balls 30 with a rotatable screw 22 which has its lower end journalled in the gear housing or stationary support 24 which is directly supported by the lower die shoe 12.

The screw 22 is journalled in a ball bearing unit 26 carried by the stationary support 24, as shown, and this arrangement allows free rotation of the screw 22 but prevents reciprocation thereof relative to the stationary support 24, so that as the nut 20 reciprocates, the screw 22 is forced to rotate. It has been found that by using a power transmitting device of this type, it is possible to transmit the necessary power from the reciprocatory nut to the rotatable screw so that the rotatable screw can be used to operate a conventional screw cutting element in a manner to be described more fully hereinafter.

For a more detailed explanation of the principle of operation of ball bearing nuts of this general type, reference is hereby made to Jones Patent No. 1,565,805 wherein the construction and principle of operation of ball bearing nuts is more fully set forth. Since ball bearing nuts of this general type are well-known in the art, it is not believed necessary to further explain the same except that the nut has formed therein a passage 28 for guiding the ball bearings 30 as they travel through the spiral groove 32 formed in the screw 22. The usual stops 34 prevent the ball bearings from escaping from the nut.

Figure 2:
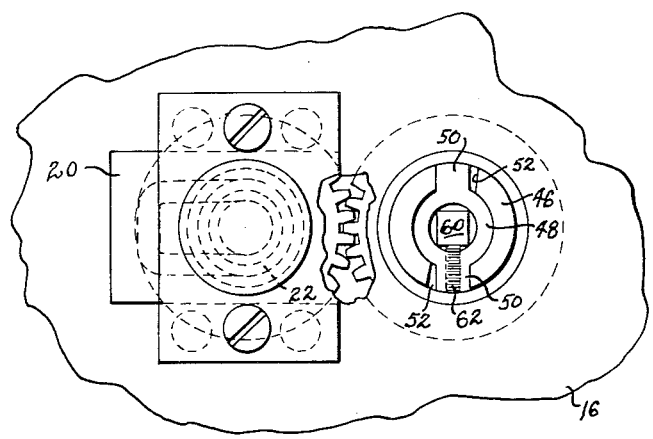
Figure 2 is a fragmentary plan view showing the relationship between the tap and the tap actuating mechanism.
Figure 3:
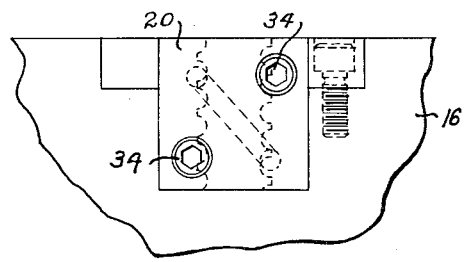
Figure 3 is a fragmentary elevational view showing the ball bearing nut construction with the screw removed.

The screw cutting apparatus may be directly driven by the screw 22 or it may be driven through gears as shown in the drawings. In the device illustrated, the lower end of the screw 22 has a pinion 40 secured thereto, so as to rotate with the screw 22. A second pinion or gear 42 is arranged in meshing engagement with the pinion 40 and is journalled in the stationary member 24 by means of the ball bearing assembly 44. The pinion 42 is provided with an upwardly extending projection 46 which serves to drive a tap holding element 48. The tap holding element 48, as best shown in Figure 2, is provided with a pair of radially projecting arms 50 which project into the slots 52 formed in the side walls of the projection 46. The slots 52 are wider than the arms 50 whereby there is provided a lost motion connection between the tap holding element and the pinion 42. This allows the pinion to start rotating without load at the beginning of each operation. The tap holding element 48 supports a tap 60 which is prevented from rotating relative to the holder 48 by any suitable means, such as the set screw 62.

By virtue of the above described arrangement of elements, it is apparent that upon reciprocation of the movable punch 16, the screw 22 will be caused to rotate and this in turn will cause rotation of the tap 60. The tap 60 and the tap holding element 48 are allowed to slide up and down within the supporting projection 46. However, the movement of the tap 60 is partly controlled by the hardened nut 64 which serves as a tap guide and which is stationarily supported on the member 66, which in turn is secured to the pressure pad member 68. In some punch presses the member 68 may be fixed to the base plate 12, whereas in others the member 68 may have limited movement relative to the base plate 12. In the particular press shown, the element 68 is slidably mounted on the pillars 70 which serve to hold the stationary part 24 in fixed relationship relative to the base plate 12.

By using a gear drive between the screw 22 and the tap 60, it is possible to offset the screw 22 from the tap 60 so that the tap 60 is directly beneath the ram 14 even though the screw 22 is in front of the ram 14.

The tap guide 64 is held in place on the support 66 by means of a set screw 72 so that the tap guide may be removed and changed whenever desired, such as when it is desired to change the size of the tap.

For the purpose of illustrating my invention, I have shown a stamping element 74 provided with a central aperture which is adapted to have internal threads formed thereon by means of the tap 60.

In order to provide an efficient and practical arrangement for both lubricating the tap and blowing the chips away, the element 66 is provided with a fluid passage 76 for conveying a mixture of compressed air and oil onto the stamping element 74. The outlet of the passage 76 is directed downwardly as indicated at 78, so as to blow all of the chips down through a passage 80 formed in the member 68.

In order to prevent any of the chips from lodging between the pressure pad 68 and the base plate 12, a sleeve element 82 is fastened within the lower passage 80 and is adapted to extend downwardly into the passage 84 in the base plate 12. The passage 84 extends the entire distance through the base plate and the supporting member 10, so as to discharge the chips and the surplus oil into a suitable receptacle, not shown, provided for collecting the chips and the oil. A mixture of compressed air and oil is fed to the passage 76 through the pipe line 77.

For purpose of illustrating the invention, a tap 60 for cutting internal threads has been shown, whereas it is obvious that the principle involved could also be used in operating a die for use in cutting external threads.

Figure 4:
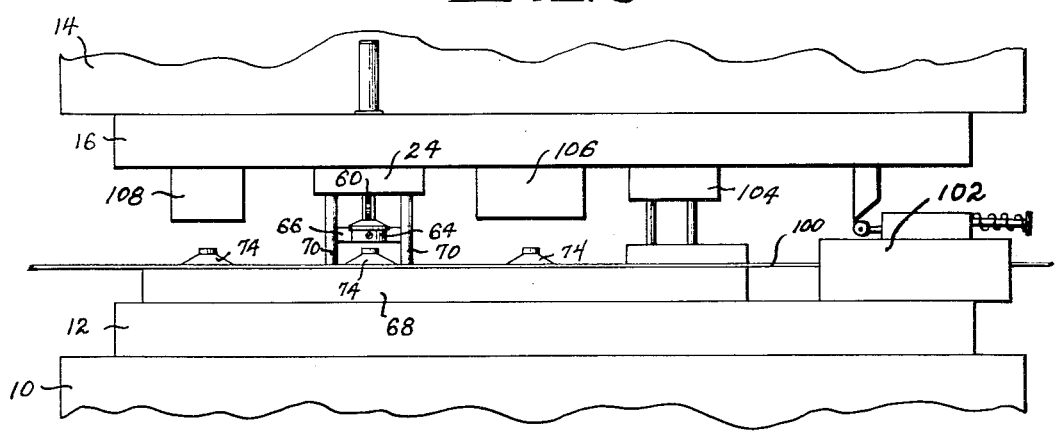
Figure 4 is a fragmentary elevational view, partly diagrammatic, showing a punch press having a progressive type of die equipped with a tapping unit.
Figure 5:
Figure 5 is a sectional view of a stamping formed in the punch press shown.

Figure 4 of the drawings shows a progressive type of die for progressively performing a series of operations on a strip of sheet metal 100 from which stampings, similar to the stamping 74 shown in Figure 5, may be formed. The sheet metal strip 100 is adapted to be progressively fed through the die by means of a conventional hitch feed 102 or any other type of feed mechanism which may be used for progressively moving the sheet metal strip through the die. Feed mechanisms of this type are well-known and need no further description.

As the strip of metal is fed through the die, it first comes to the piercing mechanism 104 which pierces holes in the strip. After having been pierced, the strip then moves to that portion of the die designated by the reference numeral 106 which for purpose of illustration is a combination forming and extruding die. As the strip is progressively moved, it next comes to the tapping die of the type shown in greater detail in Figure 1 of the drawings. After the central aperture of the stamping has been tapped, the strip is progressively moved to a point where a blanking die 108 severs the main stamping from the strip. It is to be understood that the particular stamping shown in Figure 5 has been selected for purpose of illustration only and that the various operations performed by the progressive die illustrated in Figure 4 have also been shown for purpose of illustration only.

It is to be understood that the ram 14 may be mechanically operated or hydraulically operated. In a mechanically operated ram it is well-known that the motion of the ram approximately follows the equation $x = r \cos wt$. Where $x$ represents the displacement of the ram from its midposition, $r$ represents the radius of the punch press operating crank, $w$ represents the angular velocity, and $t$ represents the time. It is also known that the velocity of the ram approximately follows the equation $v = -wr \sin wt$. The acceleration of the ram approximately follows the equation $a = -w^2 r \cos wt$.

Figure 11:
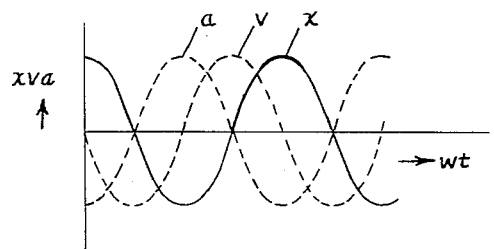

These relationships have been shown in Figure 11 of the drawings and, as illustrated thereby, the velocity of the ram and consequently the rotational motion of the tap is zero at the top and bottom points of the stroke of the ram. This means that starting from the top position at rest, the velocity of the tap is gradually accelerated to a maximum at a midpoint of the stroke and decelerated again to zero speed at the bottom of the stroke. This permits faster operation of the tap during the main threading operation without any sudden reversals, thereby giving smooth operation and minimizing mechanical impact and shock to the parts of the tapping device.

Figure 10:
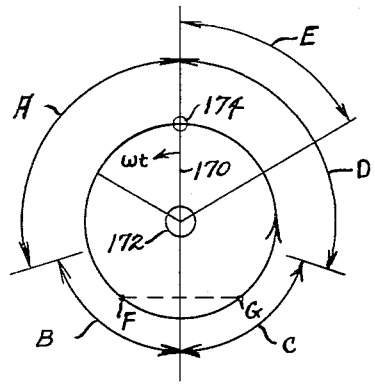
Figures 10 and 11 are diagrammatic views used for illustrating the principle of operation.

In order to more clearly illustrate the sequences of operation of the punch press and the tapping apparatus, Figure 10 of the drawings has been prepared. In this figure, 170 designates the conventional crank for operating the ram of a punch press. This crank rotates about the center or crank shaft 172 and is provided with a crank pin 174 at its outer end. As the crank begins to rotate in the counterclockwise direction, the ram, such as the ram 14 of Figure 1, begins to move downwardly through the distance A before the tap strikes the work (stamping 74 in Figure 1), but during this time the tap screws downwardly in the tap guide 64 until the tap does strike the piece to be tapped. As the crank continues to rotate through the distance B, the tap screws into the work, and as the crank moves through the distance C, the tap unscrews out of the work. The remaining portion of the cycle during which the tap screws upwardly in the tap guide has been designated by the reference character D. The tap must, of course, be out of the work on the return stroke of the press before the stock feeder 102 starts to feed the stock 100. The stock feeding period is indicated by the reference character E.

Substantially the same equations and relationships which have been discussed hereinabove hold true in hydraulically operated presses, since it is customary in hydraulically operated presses to cushion the stroke of the ram both in starting and stopping at both ends of the stroke and this cushioning in turn will be transmitted to the mechanism of the tapping device, so the result is much the same as in a mechanically operated ram.

The mechanism used for imparting rotation to the tap element 60 has been specifically illustrated in Figure 4 as one part of a progressive set of tools, but the thread cutting element is equally applicable to individual dies for secondary operations wherein it is desired to simultaneously thread and trim a stamping containing previously formed holes or to simultaneously thread and trim die cast parts, sand cast parts, or plastic parts.

For purposes of illustration, the lower die shoe has been shown resting directly on the main frame or bed 10, whereas it is obvious that a bolster plate could be used between the lower die shoe and the bed 10.

As best illustrated in Figure 2 of the drawings, a lost motion connection has been shown between the tap holding element 48 and the gear projection 46, but a direct sliding spline without the lost motion connection could be used when the device is used for operating small size taps.

It will be observed that the tap guide 64 influences the speed at which the tap reciprocates as it is rotated and that by loosening the set screw 72, the tap guide 64 may be manually rotated so as to adjust the depth that the tap enters the piece to be tapped. The tap guide 64 is also used to unscrew the tap from the tapping fixture whenever it is necessary to remove the tap for sharpening or replacement purposes. A housing 105 encloses the upper end of the screw 22, so as to protect the screw from damage.

In Figure 1 of the drawings there is shown a gun tap which is preferred, since it inherently starts the chips downwardly and drives them ahead of the tap. A standard tap could be used and, in fact, would be preferred in applications such as tapping blind holes where it is desirable to have the chips come out on top of the piece to be tapped.

Figure 6:
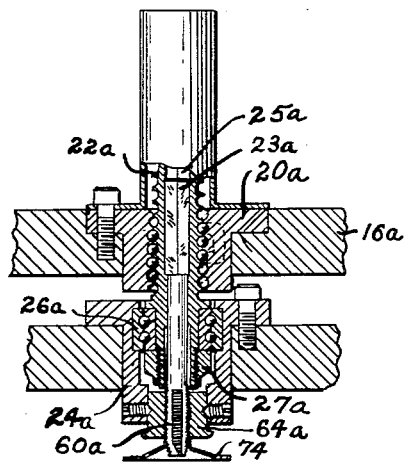
Figure 6 is a fragmentary vertical sectional view showing a modified construction.

Referring now to Figure 6 of the drawings wherein there is shown an alternative arrangement, the same reference numerals have been used to designate those parts which are similar in construction and function to parts shown in Figure 1, but the letter a has been added after some of the numerals so as to distinguish these parts from the parts shown in Figure 1. While not all of the parts are exactly alike, for the most part they are very similar in construction and function. Thus, reference numeral 16a designates a movable die shoe which carries a ball bearing nut 20a which correspond respectively to the die shoe 16 and nut 20 shown in Figure 1. Reciprocation of the movable die shoe 16a imparts rotation to the screw 22a. In this modification the tap 60a is slidably mounted within the screw 22a and has a square upper end portion 23a which is vertically slidable within a square recess 25a in the screw 22a, so that there can be no relative rotation between the tap 60a and the screw 22a, but the tap 60a can slide up and down within the screw 22a. Suitable ball bearing means 26a are provided for rotatably supporting the screw 22a. A tap guide 64a is carried by the stationary housing 24a and serves to control the feeding of the tap into the stamping 74 as the upper die shoe is reciprocated. A nut 27a holds the lower end of the screw 22a in place in the bearing 26a.

Figure 7:
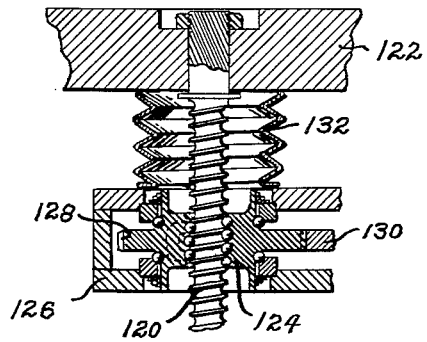
Figure 7 is a fragmentary vertical sectional view showing still another modification.

In Figure 7 of the drawings there is shown still another arrangement wherein a screw 120 has its upper end fixed to the movable die shoe 122 and has its lower end cooperating with a ball bearing nut 124 which is journalled for rotation within the fixed gear housing 126. The gear housing 126 corresponds to the gear housing 24 of the device shown in Figure 1 and is adapted to be supported on the lower die shoe of a punch press. The outer periphery of the nut 124 is provided with gear teeth 128 which are arranged to mesh with a gear 130. The gear 130 corresponds to the gear 42 in the device shown in Figure 1 and is adapted to operate thread cutting apparatus similar in all respects to the thread cutting apparatus shown in Figure 1 of the drawings. A bellows 132 has been provided, as shown, to prevent the entry of metal chips into the gear housing 126.

Figure 8:
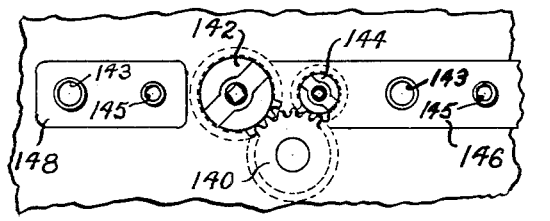
Figure 8 is a fragmentary plan view showing an arrangement wherein a plurality of tapping units are arranged to be operated in unison by a single operator of the type shown in Figures 1, 6 and 7.
Figure 9:
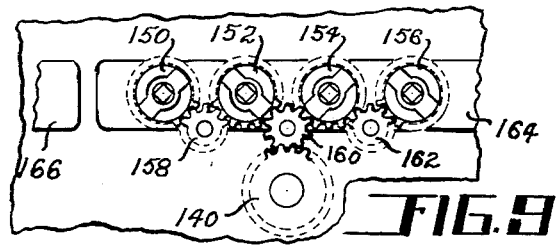
Figure 9 is a view similar to Figure 8 showing a different gearing arrangement.

In each of the arrangements shown in Figures 1 through 7, only one screw cutting element has been shown, whereas the gears 40 and 128 could be arranged to operate two or more screw cutting devices by arranging the gears as shown in Figures 8 and 9.

In Figure 8 of the drawings I have shown a gear 140 which corresponds to either the gear 40 of Figure 1 or 128 of Figure 7 and which is arranged to drive a pair of tapping units generally designated by the reference numerals 142 and 144. The tapping units 142 and 144 would correspond in construction to the tapping unit shown in Figures 1 and 2. It will be noted that the driving gear for the tapping unit 142 has more teeth than the driving gear for the tapping unit 144, whereby the tap operated by the unit 142 would rotate at a different speed than the tap operated by the unit 144. By virtue of this arrangement, it is possible to simultaneously operate unlike taps. Thus, one of the taps could be used for cutting a much smaller number of threads per inch than the other of the taps and yet the taps would both move through the holes to be tapped at substantially the same axial speed. The reference numeral 146 has been used to designate the strip from which the finished stampings 148 are cut.

In the construction shown in Figure 9 of the drawings the main gear 140 has been shown as driving a series of tapping units 150, 152, 154, and 156 through a series of idler gears 158, 160 and 162 which are arranged as shown. For purposes of illustration, the tapping units 150, 152, 154, and 156 have been shown as arranged in a straight line, whereas it is obvious that by suitably arranging the gearing, it would be possible to tap a series of scattered holes which are out of alignment with one another. In Figure 8 the reference numeral 164 designates the strip of metal to be operated on, whereas the numeral 166 designates the finished stamping leaving the punch press.

By performing the threading operation before the individual pieces 74 are separated from the strip 100, 146 or 164, one saves the cost and inconvenience of handling the individual pieces subsequently in a separate threading machine.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a punch press, a stationary bed, a stationary die shoe element, means for removably supporting the stationary die shoe element in fixed spaced relation to said bed, a movable ram, a movable die shoe element arranged in the path of said ram, a screw cutting element, means carried by said stationary die shoe element for rotatably supporting said screw cutting element, said last mentioned means comprising means for slidably supporting said screw cutting element, a power conversion assembly comprising a reciprocating driving member and a complementary rotary driven member, said driving member being secured to said movable die shoe element so as to move in unison therewith, means on said stationary die shoe element for rotatably supporting said driven member without axial movement thereof, and means for transmitting power from said driven member to said screw cutting element, said screw cutting element comprising a tap, a threaded tap guide for engaging the threads of the tap, a pressure pad removably supported on said bed, said pressure pad supporting the work, and means on the pressure pad for supporting said tap guide in fixed spaced relation with respect to the work.

2. In a punch press according to claim 1, wherein the tap guide is provided with a fluid passage having an outlet arranged to direct fluid downwardly adjacent said tap.

3. In a punch press according to claim 1, wherein the pressure pad is provided with an aperture directed beneath said tap and the sleeve supported within said aperture and including a portion projecting beyond the lower surface of said pressure pad, said lower die shoe element having an aperture arranged in alignment with said first named aperture for receiving the projecting end of said sleeve.

References Cited in the file of this patent

UNITED STATES PATENTS

| | | |
|---|---|---|
| 1,085,785 | Baker | Feb. 3, 1914 |
| 1,565,805 | Jones | Dec. 15, 1925 |
| 1,731,117 | Warren | Oct. 8, 1929 |
| 2,191,915 | Protin | Feb. 27, 1940 |
| 2,250,349 | Berquist | July 22, 1941 |
| 2,314,138 | Garbe et al. | Mar. 16, 1943 |
| 2,341,462 | Matson | Feb. 8, 1944 |
| 2,346,297 | Garbe | Apr. 11, 1944 |
| 2,493,933 | Thompson | Jan. 10, 1950 |
| 2,501,738 | Prutton | Mar. 28, 1950 |
| 2,509,696 | Pe Card | May 30, 1950 |

FOREIGN PATENTS

| | | |
|---|---|---|
| 558,865 | Great Britain | Jan. 25, 1944 |